No. 883,741. PATENTED APR. 7, 1908.
L. RHODES.
YIELDABLE GEARING FOR TRACTION WHEELS.
APPLICATION FILED MAR. 14, 1906.
2 SHEETS—SHEET 1.
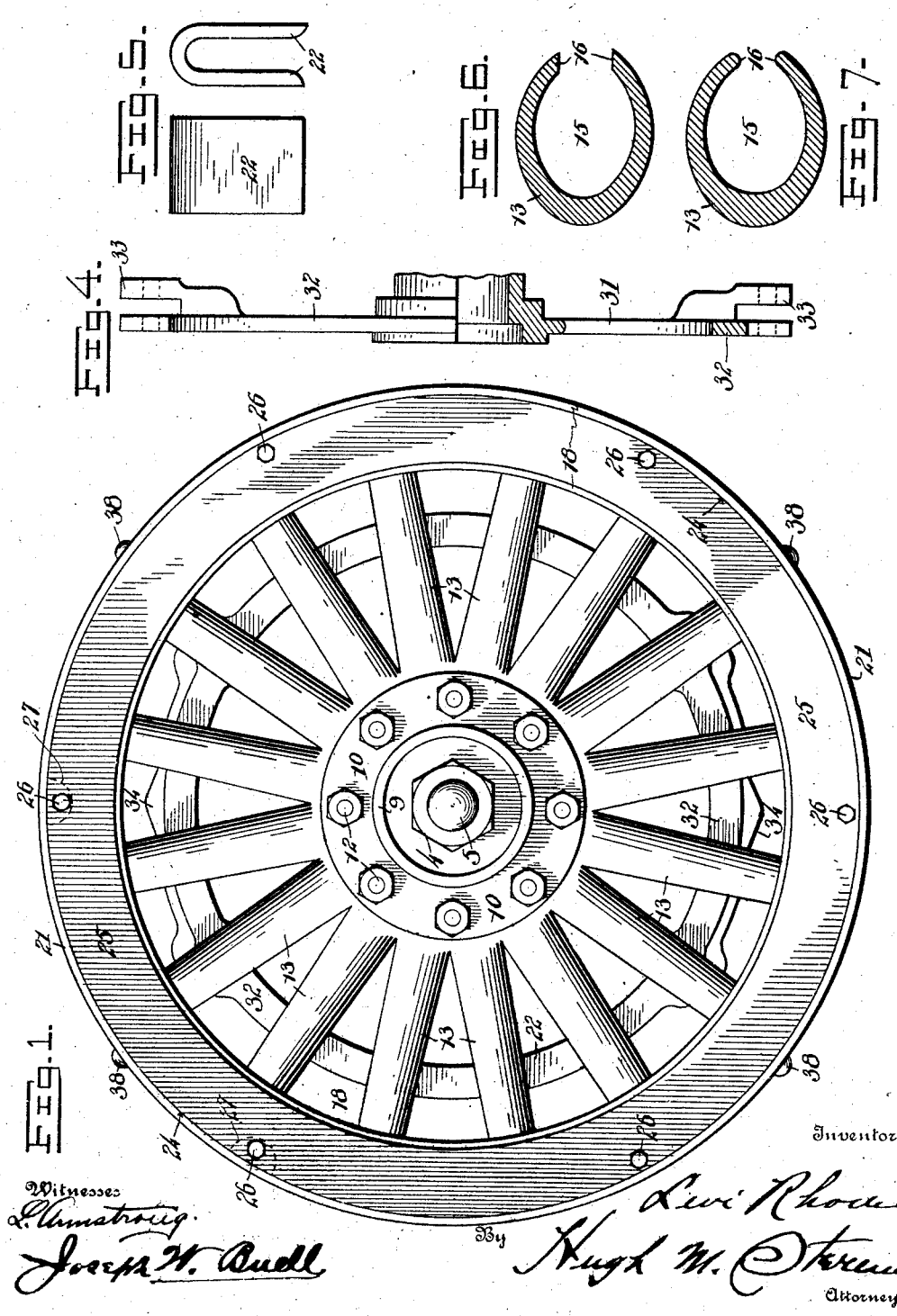

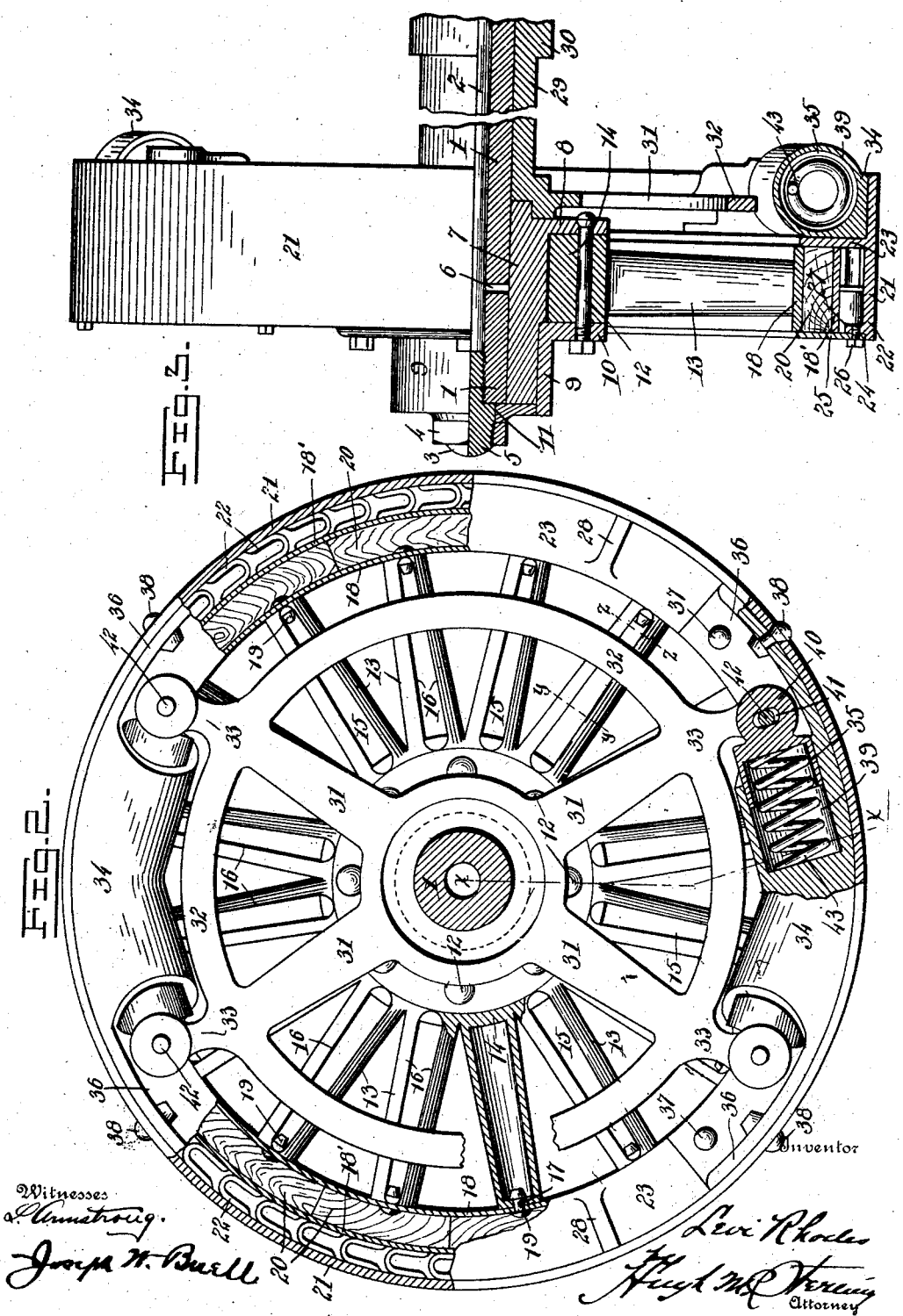

UNITED STATES PATENT OFFICE.

LEVI RHODES, OF SPOKANE, WASHINGTON.

YIELDABLE GEARING FOR TRACTION-WHEELS.

No. 883,741.   Specification of Letters Patent.   Patented April 7, 1908.

Application filed March 14, 1906. Serial No. 306,000.

*To all whom it may concern:*

Be it known that I, LEVI RHODES, a citizen of the United States, residing at Spokane, in the county of Spokane and State of Washington, have invented new and useful Improvements in Yieldable Gearing for Traction-Wheels, of which the following is a specification.

This invention relates to traction wheels, and the object thereof is to provide a traction wheel with a yieldable or cushioned gear of improved construction in order to prevent the jarring incident to sudden application of the driving power or the brake, and also to prevent sudden strain coming upon the engine from the sudden stopping of the traction wheels from any cause.

The invention consists in certain novel features in the construction and arrangement of parts, all as hereinafter described, and pointed out in the appended claims.

In the accompanying drawings, Figure 1, is an outer face view of a wheel constructed in accordance with the invention; Fig. 2, an inner face view of the wheel shown partly in section; Fig. 3, a view partly in end elevation and partly in section, the section being taken on the line X—X of Fig. 2; Fig. 4, a view partly in end elevation and partly in transverse section of a cushioned gear element; Fig. 5, top and side views of the tire cushioning spring; Fig. 6, a transverse section taken through a spoke on the line Y—Y of Fig. 2; and Fig. 7, a transverse section taken through the spoke on the line Z—Z of the same figure.

Referring to the drawings, 1 designates a journal of tubular form and of comparatively large diameter in order to specially combine with the traction wheel of the invention and admit of the employment of the large hub and the short spoke construction shown, without unduly increasing the weight of the wheel. The bore 2 of the journal is screw-threaded at its end and receives a screw-threaded plug 3, the projecting part of which is also screw-threaded to receive a hub-retaining nut 4, and provided with an annular bearing portion 5 adapted to shoulder on the end of the journal. An oil feed duct 6 leads from the bore 2 to the bearing face of the journal, and a sufficient quantity of lubricant is readily supplied to the bore by the removal of the plug 3. The hub comprises a bearing sleeve section 7 to fit the journal, and having an annular flange 8 at its inner end, and a cap-section 9, formed with a flange 10 at its inner end, and adapted to fit over the section 7 and shoulder thereon at its inner end and at its outer end bear against the end of said section and the end of the journal. An opening 11 is formed in the center of the cap section 9 of a size to admit the projecting plug 3 and form a bearing contact to the annular portion 5 thereof. When the nut 4 is applied the cap is held against outward movement and in bearing contact with the end of the journal. The two sections of the hub are held together by the bolts 12 which connect the flanges 8 and 10 in their spaced relation, and clamp between them the series of spokes 13.

In conjunction with the hub construction, as described and shown, a special construction is preferably employed with reference to the spokes, which are cast integral with an annular or hub section 14 that is designed to be fitted upon the section 7 and be clamped between the flange thereof and the flange of the cap section, which is subsequently applied.

The spokes proper are cast in hollow form, the hollow 15 of which opens at the inner side of the spoke in a longitudinal slot 16 extending substantially the entire length of the spoke. The rim end of the spokes are closed to furnish a solid bearing portion in which is formed a bore 17 communicating with the interior hollow of the spoke, in order that attachment may be made to the rim 18 by means of the rivets 19, which receive heads within the interior of the spokes, and which are secured thereon by the usual riveting operation, the same being readily possible from the construction shown.

In the present invention the rim 18 is principally designed to coöperate with a rim 18' of larger circumference, between which rims is held a wooden felly, preferably comprising a plurality of blocks 20, which produce together with the rims 18 and 18' a combined rim of the necessary strength and lightness, possessing to a certain degree an elastic character. The combination rim thus devised is designed to receive a metal tire 21 cushioned by means of the interposed spring 22, or other cushioning devices.

The tire 21 is formed with an inwardly extending flange 23, designed to overlap the rims 18 and 18' and have bearing thereon, while an annular recess 24 is formed in the outer edge of the tire to receive an annular plate or flange 25 designed to perform the same function as flange 23 upon the opposite side of the combination rim and with said flange 23 retain the felly block 20 in place as well as the cushioning devices, and permit the required movement of the wheel with relation to the tire. The annular plate or removable flange 25 is secured by means of screw-threaded bolts 26 engaging lugs 27 formed on the inner face of the tire at intervals. The flange 23 is located at a point removed from the inner edge of the tire and is reinforced against lateral strain by the struts 28, located at suitable intervals.

The cushioning of the wheel with relation to the gearing for rotating the same, and its brake, will now be referred to. The journal is provided with a sleeve 29 which may be provided with a suitable gear, not shown, by which the motive power is transmitted, and a drum 30 for the application of a brake of any approved construction. This gear sleeve 29 at its outer end is cast with a spider comprising the spoke arm 31, connecting ring 32, and projections 33, and forms a leverage connecting element between the wheel and the said sleeve, which is acted on by said wheel, or vice versa, through the cushion devices shown. These devices consist of two socket members 34, arranged opposite each other on the inner side of the projecting part of the tire, and a plunger or cap 35 working within each socket and forming a dash-pot thereof, and connecting the spider projection 33. These socket members fit the curve of the tire and terminate at each side in an attaching portion 36 having an L-shaped cross section, and being secured by the rivets 37 and 38 to the flange 23 and the tire respectively. Each socket member has two sockets 39, oppositely disposed to each other, the bore of each being cylindrical and formed at an inward inclination, so that the movement of the plungers or caps 35 will follow the direction of the projection 33 as near as possible. To compensate for the variation in the movement of the projections 33, a vertical slot 40 is formed in the connecting lug 41, which slot receives the pivot 42 and permits the necessary back and forth movement of the pivot which is transverse to the direction of movement of the plunger or cap.

Within each socket 39 is located a strong spiral spring 43 seating at its outer end within the plunger or cap 35 so that the yielding resistance to the rotary gear element will be preferably the combined spring and air-cushion, but it is obvious that either of these cushion devices can be employed independently of the other, the plunger and socket serving to furnish a seat for the spring as well as a housing and guide therefor when used independently of its function as an air-cushioning device.

Having thus described my invention, what I claim and desire to secure by Letters Patent, is:—

1. The combination with a wheel element, of a gear element rotatable relative thereto, sockets in opposed relation carried by one of the said elements, a spring within each socket, and a bearing cap for each spring working within a socket thereof, and adapted to cushion, on the air within said socket, said bearing cap being pivotally connected to the other element, substantially as and for the purpose set forth.

2. The combination with a wheel element, of a gear element rotatable relative thereto, one of the said elements provided with one or more sockets, and the other with plungers working within said sockets and having each a pivotal connection with the other element and adapted at its said connection to have movement transverse to its movement within its socket, substantially as and for the purpose set forth.

3. The combination with a wheel element, of a gear element rotatable relative thereto, one of said elements provided with dash-pots opposed one to the other, a plunger for each dash-pot pivotally connected to the other element and adapted to have movement at said connection transverse to the plunger movement, substantially as and for the purpose set forth.

In testimony whereof I affix my signature, in presence of two subscribing witnesses.

LEVI RHODES.

Witnesses:
H. S. HERKELRATH,
E. E. BRANDT.